UNITED STATES PATENT OFFICE.

GEORGE J. COLBY, OF WATERBURY, VERMONT.

IMPROVEMENT IN FASTENING INDIA-RUBBER ROLLS TO METALLIC SHAFTS.

Specification forming part of Letters Patent No. 34,818, dated April 1, 1862.

*To all whom it may concern:*

Be it known that I, GEO. J. COLBY, of the town of Waterbury, in the county of Washington and State of Vermont, have invented a new and Improved Mode of Fastening or Uniting India-Rubber Rolls to Metallic Shafts; and I do hereby declare that the following is a full and exact description thereof.

The nature of my invention consists in heating the shaft to such a degree that it will melt the rubber immediately in contact with it, and burn out the sulphur used in vulcanizing the rubber, leaving it in a sticky state, which effectually prevents the shaft from turning in the roll.

To enable others to use my invention, I will proceed to describe its operation.

I have the rubber roll prepared as usual, with hole for the shaft about one-half the diameter of the shaft. I then heat my shaft until it will melt a piece of vulcanized rubber applied to it enough to make it sticky. I then put the shaft in a vise or any convenient place to hold it firm, and taking the roll in both hands push it onto the shaft. If the shaft is hot enough, the roll will go on easily without using any lubricator, as it will melt the rubber sufficiently to lubricate itself. If the shaft is too hot, the melted rubber will run out at the ends of the roll, which it should not do, and if not hot enough the rolls cannot be put on unless forced by a machine. As soon as the rubber is in the right place on the shaft, throw it into cold water to prevent its melting too much.

By this process the rubber becomes cemented to the shaft, so that no power can turn it on the shaft without tearing the roll in pieces.

I do not claim simply the application of heat to the shaft, as that has been done before in a less degree for the purpose of drying the cement and other lubricators that have been used in putting the shaft into the rubber; but

What I claim as my invention, and desire to secure by Letters Patent, is—

The application of a greater degree of heat to the shaft than was used in vulcanizing the rubber, and sufficient to slightly melt the rubber as the shaft is forced into it, thus forming a lubricator until the shaft is in place, and then by immediately cooling the melted rubber becomes a cement that unites the shaft and rubber firmly together.

GEO. J. COLBY.

Witnesses:
   F. J. GREEN,
   A. LANDT.